Patented May 9, 1939

2,157,126

UNITED STATES PATENT OFFICE 2,157,126

COMPOSITION OF MATTER AND METHODS AND STEPS OF MAKING AND USING THE SAME

Mortimer T. Harvey, East Orange, N. J., assignor to The Harvel Corporation, a corporation of New Jersey No Drawing. Application October 25, 1935, Serial No. 46,744

10 Claims. (Cl. 260—46)

The present invention relates to synthetic resins of the type made by condensing a methylene containing agent and a phenol and to methods and steps for making the same; and the present invention relates more particularly to condensation products of a methylene containing agent and a phenol having the following structure

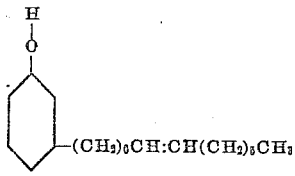

and to methods and steps of making the same. The compound of this structure is called Cardanol, which is a trade-mark name.

Cardanol is obtained by removing the carbon and the two oxygen atoms of the carboxylic group from the anacardic acid of cashew nut shell liquid. Anacardic acid has the empirical formula $C_{21}H_{32}O_3$ and the structural formula

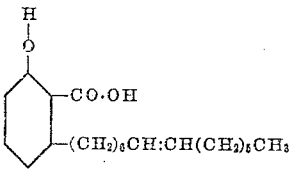

Cashew nut shell liquid as it occurs in its natural form consists of about 90% of anacardic acid, about 10% of cardol, which latter has the empirical formula $C_{32}H_{52}O_4$, and a very small percentage of undetermined material. Both anacardic acid and cardol are phenols, each has an unsaturated side chain and each has at least two of the most reactive positions, orthos and para, free to react as with a condensing agent such as a methylene group.

Resins are made by condensing methylene containing agents with cashew nut shell liquid as shown by my Patent Numbers 1,725,791; 1,725,795; 1,725,797; 1,821,095; 1,921,292; 1,921,293; and others, in which cases both the anacardic acid and the cardol constituents of the cashew nut shell liquid react with the methylene containing agents to form the resins.

Cardanol is useful for making coatings such as paints, varnishes, lacquers, and so on, for impregnating compounds, for molded compounds and these products are also highly suitable for electrical insulation, for chemical and water and moisture proofings. Cardanol can be reacted with formaldehyde, hexamethylene tetramine, paraformaldehyde, paraldehyde, ethylaldehyde, furfuraldehyde, butyl aldehyde, benzaldehyde and other compounds having aldehyde groups and any mixture of reactive methylene group containing materials. Cardanol can also be reacted with paint and varnish driers such as manganese resinate, lead oxides including litharge, metal-organic driers such as cobalt acetate and copper oleate, and other reactions such as are shown for cashew nut shell liquid reactions in my patents listed above, to which reference is hereby made. The present invention is an improvement on the inventions disclosed in these patents and the products of Cardanol have further advantages than the cashew nut shell liquid itself, for example, the Cardanol-cresol-formaldehyde condensation products are soluble to a greater extent in linseed and China-wood oils than are the cashew nut shell liquid-cresol-formaldehyde condensation products.

The present application is a continuation-in-part of my copending application Serial No. 703,414, filed December 21, 1933, Patent No. 2,093,824.

Cashew nut shell liquid is distilled at a greatly reduced pressure or in a stream of steam at atmospheric pressure to produce a compound having a molecular weight of 288, a boiling point of 225° C. at about 10 millimeters of mercury, an empirical formula of $C_{20}H_{32}O$, and a probable structural formula of $C_{14}H_{27}C_6H_4OH$. Characteristics and reactions indicate that this compound is a phenol with all or part of the $C_{14}H_{27}$· atoms together as one radical in the meta position with respect to the ·OH radical and with one unsaturated bond, $$-\underset{H}{\overset{}{C}}=\underset{H}{\overset{}{C}}-$$

somewhere in the $C_{14}H_{27}$· atoms. This production of the new compound apparently takes place by the breaking down of the anacardic acid. Cardanol has been found to have approximately the following characteristics:

Characteristics of Cardanol

Molecular weight...... 288
Empirical formula...... $C_{20}H_{32}O$
Accepted structural formula........... $C_6H_3\diagup\overset{OH}{\underset{C_{14}H_{27}}{}}$ (1, 3)

Index of refraction...... $N_D^{25}$ 1.5112
Boiling point............ About 225° C. at ten millimeters of mercury
Melting point........... Below minus 20° C. at normal pressure
Density................. 0.930 at 20° C.
Color (in liquid state)... Straw color Illustrative examples of condensation products made from Cardanol and of methods of making the same are as follows:

*Example I.*—About one hundred parts by weight of Cardanol, twenty-five parts of a twenty-six per cent solution of formaldehyde and three parts of ammonia are refluxed together for about one hour after which the reaction product is separated from the water layer and then heated for about one hour under vacuum to remove the remaining water. The yield under commercial practice is about one hundred parts by weight of the Cardanol-formaldehyde condensation product which at this stage is of a syrupy consistency and is soluble in linseed oil and in China-wood oil and in ordinary solvents including petroleum spirits such as gasolene and kerosene. This Cardanol-formaldehyde condensation product can be set to a solid state and it is useful in making varnishes, lacquers, paints, impregnating compounds and so on.

*Example II.*—In another method approximately molecular proportions of Cardanol and formaldehyde are reacted, for example, about 290 grams of Cardanol, 80 cubic centimeters of a 37.5% water solution of formaldehyde and 10.2 cubic centimeters of a 26% ammonia solution are refluxed for about one hour after which the water layer is separated. The resin resulting from the reaction is dehydrated and bodied at 125° C. to a desired body. One hour at this temperature gives a suitable body for making a baking enamel with petroleum solvent as a thinner to about 50% solids.

*Example III.*—Another example is as follows. About one hundred parts by weight of Cardanol and eight parts of hexamethylene tetramine are heated together up to 125° C. and allowed to cool, the result is a condensation product which is thick and viscous when cool and when warm can be dissolved in a petroleum hydrocarbon such as gasolene or kerosene. In these proportions the ratio of formaldehyde to Cardanol is about mole for mole. Greater proportions of hexamethylene tetramine can be used to give larger proportions of formaldehyde to Cardanol, up to three moles of formaldehyde.

*Example IV.*—About one hundred parts by weight of China-wood oil and one hundred parts of Cardanol are heated up to 600° F. and chilled back with one hundred parts of Cardanol. At 150° C. sixteen parts of hexamethylene tetramine are added slowly and stirred in until solution is complete. This product can be thinned with a solvent such as a petroleum hydrocarbon. Driers can be used if desired, such as litharge or manganese resinate, for example, in amounts equivalent to from about two per cent of the weight of the China-wood oil to about two per cent of the combined weight of Cardanol and China-wood oil. The condensation products of the above examples can be set at about 300° to 350° F.

*Example V.*—About one mole of Cardanol and two moles of cresol (e. g., o-cresol) are refluxed with an aqueous formaldehyde solution, in amount equal to one mole of formaldehyde for each mole of Cardanol and cresol, for about one hour after which the water is removed and the condensation product bodied at about 125° C. to a desired body. This condensation product, either bodied or before bodying, is soluble in linseed and in China-wood oils in a great range of proportion, for example, from one containing one part of the condensation product to nine parts of linseed oil to one containing nine parts of the condensation products to one part of linseed oil. Driers, litharge, manganese resinate and so on, can be heated in for setting the oil and a varnish made by thinning with petroleum solvents to fifty per cent solids, for example. An example is equal parts of the bodied condensation product and linseed oil heated to 450° F. and one per cent each of litharge and manganese resinate added, cooled to 325° F. and thinned with an equal weight of petroleum solvent. This varnish is good as electrical insulation, for resistance to oils, alcohol, acids and alkalis.

Various modifications can be made by using various proportions of formaldehyde, from less than one molecular proportion to about three molecular proportions of formaldehyde to one molecular proportion to Cardanol.

When one to three molecular proportions of aldehyde to one of Cardanol are used the aldehyde condensation products of Cardanol are soft and viscous and are heat reactive to give infusible, insoluble resins which are soft and flexible and are not hard or brittle and retain these characteristics in their ultimate state of heat reaction. When the reactive condensation products are applied as films, as for example with a solvent, and then set by heat reaction the film is soft and flexible and is resistant to alkali, alcohol and petroleum oils. The condensation products before ultimate heat reaction are soluble in petroleum hydrocarbons and in drying oils such as China-wood oil and linseed oil. When less than a molecular proportion of aldehyde is used the product is a mixture of Cardanol and of Cardanol-aldehyde condensation product and when the latter predominates its characteristics will predominate in the mixture and the latter can be used in coatings, lacquers, varnishes, paints and so on.

The condensation products of the present invention can be used alone or with drying oils, with natural and artificial resins, gums and pitches, with waxes and with materials generally used in making coatings, impregnations and molded products.

The Cardanol-aldehyde condensation products of the present invention can be mixed with drying oils or solvent vehicles or both either before or after condensation with an aldehyde. In this respect the drying oils can be considered as solvents for the Cardanol. Also the Cardanol-aldehyde condensation products and the mixtures thereof with drying oils can be used with or without driers.

In the present claims, it is intended that the term "aldehyde" shall be generic to reactive methylene containing agents such as hexa-methylene tetramine.

Having thus described my invention what I claim and desire to protect by Letters Patent is:

1. The process of producing resins which comprise condensing an aldehyde with a phenolic compound derived from and separated from other phenolic derivatives and constituents of cashew nut shell liquid and having the following structure

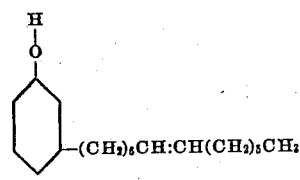

2. The method which comprises condensing from about one to three molecular proportions of an aldehyde with one molecular proportion of a phenolic compound derived from and separated from other phenolic derivatives and constituents of cashew nut shell liquid and having the following structure.

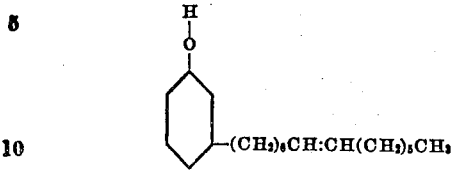

in the presence of ammonia as a catalyst.

3. A synthetic resin comprising a condensation product of a methylene containing agent and a phenolic compound derived from and separated from other phenolic derivatives and constituents of cashew nut shell liquid and having the following structure

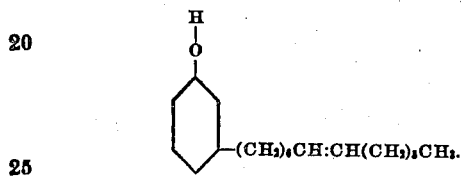

4. A soft, viscous condensation product of from about one to three molecular proportions of an aldehyde and one molecular proportion of a phenolic compound derived from and separated from other phenolic derivatives and constituents of cashew nut shell liquid and having the following structure

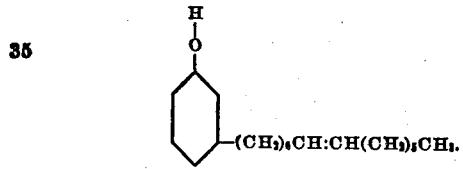

5. A condensation product of an aldehyde and a phenolic compound derived from and separated from other phenolic derivatives and constituents of cashew nut shell liquid and having the following identification; molecular weight 288; approximate empirical formula, $C_{20}H_{32}O$; structural formula,

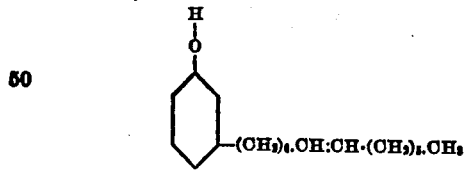

index of reflection, $N_D^{20}1.5112$ boiling point, about 225° C. at ten millimeters of mercury; melting point, below minus 20° C.; density, about 0.930 at 20° C.

6. A condensation product of an aldehyde and a phenolic compound derived from and separated from other phenolic derivatives and constituents of cashew nut shell liquid; having one oxygen atom; having a boiling point of about 225° C. at a pressure of 10 millimeters of mercury; having a molecular weight of about 288; and identifiable as obtainable from cashew nut shell liquid by distillation at a vapor pressure of about 225° C. at 10 m.m. of mercury, and by steam distillation at normal pressure.

7. The method which comprises destructively distilling cashew nut shell liquid with steam to obtain a phenolic compound derived from and separated from other phenolic derivatives and constituents of cashew nut shell liquid and having a boiling point of about 225° C. at a pressure of about ten millimeters of mercury and condensing said phenolic compound with an aldehyde.

8. The condensation product of an aldehyde with a phenolic compound derived from and separated from other phenolic derivatives and constituents of cashew nut shell liquid and having approximately the following formula, $$C_{14}H_{27}C_6H_4OH$$

and identifiable as obtainable by the breaking down of anacardic acid, the latter being identified as the major constituent of cashew nut shell liquid, with the aid of heat.

9. The condensation product of an aldehyde with a phenolic compound derived from and separated from other phenolic derivatives and constituents of cashew nut shell liquid and derived from the breaking down of anacardic acid and having a boiling point of about 225° C. at about ten millimeters of mercury.

10. A condensation product of an aldehyde and a phenolic compound derived from and separated from other phenolic derivatives and constituents of cashew nut shell liquid and having the following identification; molecular weight 288; approximate empirical $C_{20}H_{32}O$ arranged structurally as

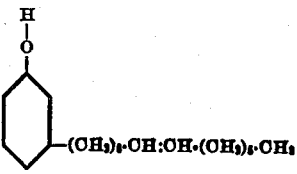

index of refraction, about $$N_D^{20}1.5112$$

boiling point, about 225° C. at ten millimeters of mercury; melting point, below minus 20° C.; density, about 0.930 at 20° C.

MORTIMER T. HARVEY.